US011022065B2

(12) United States Patent
Azevedo et al.

(10) Patent No.: US 11,022,065 B2
(45) Date of Patent: Jun. 1, 2021

(54) PISTON WITH SEALED COOLING GALLERY CONTAINING A THERMALLY CONDUCTIVE COMPOSITION

(71) Applicant: FEDERAL-MOGUL CORPORATION, Southfield, MI (US)

(72) Inventors: Miguel Azevedo, Ann Arbor, MI (US); Warran Boyd Lineton, Chelsea, MI (US)

(73) Assignee: Tenneco Inc., Lake Forest, IL (US)

( * ) Notice: Subject to any disclaimer, the term of this patent is extended or adjusted under 35 U.S.C. 154(b) by 465 days.

(21) Appl. No.: 15/364,616

(22) Filed: Nov. 30, 2016

(65) Prior Publication Data
US 2017/0159604 A1 Jun. 8, 2017

Related U.S. Application Data

(60) Provisional application No. 62/262,704, filed on Dec. 3, 2015.

(51) Int. Cl.
*F02F 3/18* (2006.01)
*F02F 3/00* (2006.01)
(Continued)

(52) U.S. Cl.
CPC ............ *F02F 3/18* (2013.01); *B22D 19/0027* (2013.01); *B23K 31/02* (2013.01); *B23P 15/10* (2013.01);
(Continued)

(58) Field of Classification Search
CPC ........ F02F 3/16; F02F 3/18; F02F 3/20; F02F 3/22; F02F 3/225; C22C 12/00
See application file for complete search history.

(56) References Cited

U.S. PATENT DOCUMENTS 2,153,501 A   4/1939 Harper, Jr.
3,545,341 A   12/1970 Fischer
(Continued)

FOREIGN PATENT DOCUMENTS

CN   1189574 A   8/1998
CN   104540637 A   4/2015
(Continued)

OTHER PUBLICATIONS

International Search Report, dated Feb. 27, 2017 (PCT/US2016/064305).
(Continued)

*Primary Examiner* — Abiy Teka
(74) *Attorney, Agent, or Firm* — Robert L. Stearns; Dickinson Wright, PLLC

(57) ABSTRACT

A heavy duty piston for an internal combustion engine comprises a thermally conductive composition filling 10 to 90 vol. % of a sealed cooling gallery. The thermally conductive composition includes bismuth and/or tin. For example, the thermally conductive composition can be a single-phase binary mixture of bismuth and tin. The thermally conductive composition has improved thermal properties, for example a melting point around 139° C., a thermal conductivity around 22 W/m·K, and a thermal diffusivity around 1.43E-5 m²/s. The thermally conductive composition is not reactive and does not include toxic or cost-prohibitive metals. During high temperature operation, as the piston reciprocates in the cylinder bore, the thermally conductive composition flows throughout the cooling gallery to dissipate heat away from the upper crown and thus improve efficiency of the engine.

7 Claims, 2 Drawing Sheets

(51) Int. Cl.
  *B23K 31/02* (2006.01)
  *B23P 15/10* (2006.01)
  *B22D 19/00* (2006.01)
  *C22C 12/00* (2006.01)
  *B23K 101/00* (2006.01)

(52) U.S. Cl.
  CPC ........ *F02F 3/003* (2013.01); *B23K 2101/003* (2018.08); *C22C 12/00* (2013.01); *F02F 2003/0061* (2013.01)

(56) References Cited

U.S. PATENT DOCUMENTS

| | | | | |
|---|---|---|---|---|
| 3,765,384 | A * | 10/1973 | Barnard | F01P 3/16 123/41.32 |
| 5,769,037 | A * | 6/1998 | Ohtsubo et al. | F01L 3/14 123/41.34 |
| 9,127,619 | B2 * | 9/2015 | Lineton | F02F 3/16 |
| 9,765,728 | B2 * | 9/2017 | Bischofberger | F02F 3/18 |
| 2013/0047948 | A1 | 2/2013 | Heuschmann | |
| 2014/0230774 | A1 | 8/2014 | Schneider | |
| 2015/0075455 | A1 | 3/2015 | Bischofberger | |
| 2015/0128892 | A1 | 5/2015 | Bischofberger | |
| 2015/0176523 | A1 * | 6/2015 | Boczek | B23P 15/10 29/888.042 |
| 2015/0247475 | A1 | 9/2015 | Bischofberger et al. | |
| 2015/0368542 | A1 * | 12/2015 | Carragher | C09K 8/426 166/288 |

FOREIGN PATENT DOCUMENTS

| | | |
|---|---|---|
| CN | 104641094 A | 5/2015 |
| CN | 104884779 A | 9/2015 |
| DE | 10036481 A1 | 2/2002 |
| DE | 102011007285 A1 | 10/2012 |
| DE | 102012009030 A1 | 11/2013 |
| DE | 102012017218 A1 | 3/2014 |
| DE | 102012014200 A1 | 5/2014 |
| DE | 102012022906 A1 | 5/2014 |
| DE | 102014010503 A1 | 1/2015 |
| JP | H09184404 A | 7/1997 |
| JP | 2015526643 A | 9/2015 |
| JP | 2016089793 A | 5/2016 |
| WO | 2014032644 A2 | 3/2014 |
| WO | 2014127319 A1 | 8/2014 |

OTHER PUBLICATIONS

Cerro Alloy Name Number Other Special Alloys Available on Request, Bi Canadametal.com, Revised Jun. 24, 1982 Form HQ-948, Feb. 16, 2017, Retrieved from the Internet URL: http://www.canadametal.com/wp-content/uploads/2016/08/cerrochart-fusible-alloys.pdf (retrieved on Feb. 16, 2017).

* cited by examiner

PISTON WITH SEALED COOLING GALLERY CONTAINING A THERMALLY CONDUCTIVE COMPOSITION

CROSS-REFERENCE TO RELATED APPLICATION

This U.S. utility patent application claims priority to U.S. provisional patent application No. 62/262,704, filed Dec. 3, 2015, the entire content of which is incorporated herein by reference.

BACKGROUND OF THE INVENTION

1. Field of the Invention

This invention relates generally to pistons for internal combustion engines, and methods for manufacturing the same.

2. Related Art

A piston used in an internal combustion engine, such as a heavy duty diesel piston, is exposed to extremely high temperatures during operation, especially along the upper crown of the piston. Therefore, to moderate temperatures, the piston is oftentimes designed with a cooling gallery beneath the upper crown, and cooling oil is sprayed into the cooling gallery as the piston reciprocates along a cylinder bore of the engine. The oil flows along the inner surface of the upper crown and dissipates heat away from the upper crown. To control the piston temperature during operation, a high flow of oil must be maintained constantly. However, the oil degrades over time due to the high temperature of the engine, and thus the oil must be changed periodically to maintain engine life. In addition, legislation and consumers have created more aggressive targets for improved efficiency of heavy duty diesel engines. For example, a Monosteel® piston capable of achieving 55% brake thermal efficiency and 60 kW/liter is desired.

One method used to further improve engine efficiency is described in U.S. Pat. No. 9,127,619 and includes partially filling a sealed cooling gallery of the piston with a two-phase composition of silicone oil and copper particles. During operation, the two-phase composition flows along the walls of the sealed cooling gallery and redistributes combustion heat from the upper crown through the piston body. The change in piston temperature profile reduces coking. The need for oil jet cooling under the piston is also reduced or eliminated, which reduces parasitic loss.

However, there are some manufacturing limitations related to the two-phase composition of U.S. Pat. No. 9,127,619, such as metering and delivery, as well as the need for argon as an inert gas in the sealed cooling gallery to prevent oxidative degradation. In addition, improved heat transfer properties are still desired, such as higher thermal conductivity and higher thermal diffusivity.

Another technique includes the use of low melting point metal alloys in the piston cooling gallery, as described in WO2014/032644 and DE102012014200. However, such alloys are typically not preferred because they include reactive, toxic, or cost prohibitive metals, such as potassium, cadmium, sodium, lead, gallium, and indium.

SUMMARY OF THE INVENTION

One aspect of the invention provides a piston for an internal combustion engine with a sealed cooling gallery containing a thermally conductive composition that provides for improved engine efficiency without the shortcomings associated with a two-phase composition or low melting point metal alloys. The piston comprises a body portion including an upper crown and the sealed cooling gallery extending along at least a portion of the upper crown. The thermally conductive composition contained in the sealed cooling gallery includes at least one of bismuth and tin.

Another aspect of the invention provides a method of manufacturing a piston for an internal combustion engine. The method includes feeding a thermally conductive composition, which includes at least one of bismuth and tin, into a cooling gallery extending along at least a portion of an upper crown of a piston. The method further includes sealing the cooling gallery.

During high temperature operation, the thermally conductive composition flows throughout the sealed cooling gallery to remove heat from the upper crown and redistribute the heat through the piston and to the surrounding environment. The thermally conductive composition has better thermal properties than the two-phase composition disclosed in U.S. Pat. No. 9,127,619 and also avoids the use of reactive, toxic, and cost-prohibitive metals, such as those disclosed in WO2014/032644A2 and DE102012014200. The thermally conductive composition is not reactive and thus can be sealed in the cooling gallery either with or without an inert atmosphere, unlike the two-phase composition of U.S. Pat. No. 9,127,619 which requires an inert atmosphere. In addition, metering and dosing of the thermally conductive composition are simplified because the composition is a single-phase liquid metal mixture above about 139° C. The thermally conductive composition could alternatively be dispensed into the cooling gallery as a powder, particles, or granules during manufacture of the piston. For example, the thermally conductive composition could be fed into the cooling gallery after welding but before heat treatment. The bismuth and/or tin will easily withstand the post-welding heat treatment temperature, which is typically around 650° C., unlike the silicone oil of the two-phase composition, which degrades around 365° C., and thus must be fed into the cooling gallery after heat treatment.

BRIEF DESCRIPTION OF THE DRAWING

Other advantages of the present invention will be readily appreciated, as the same becomes better understood by reference to the following detailed description when considered in connection with the accompanying drawings wherein.

DETAILED DESCRIPTION OF EXAMPLE EMBODIMENTS

Figure 1:
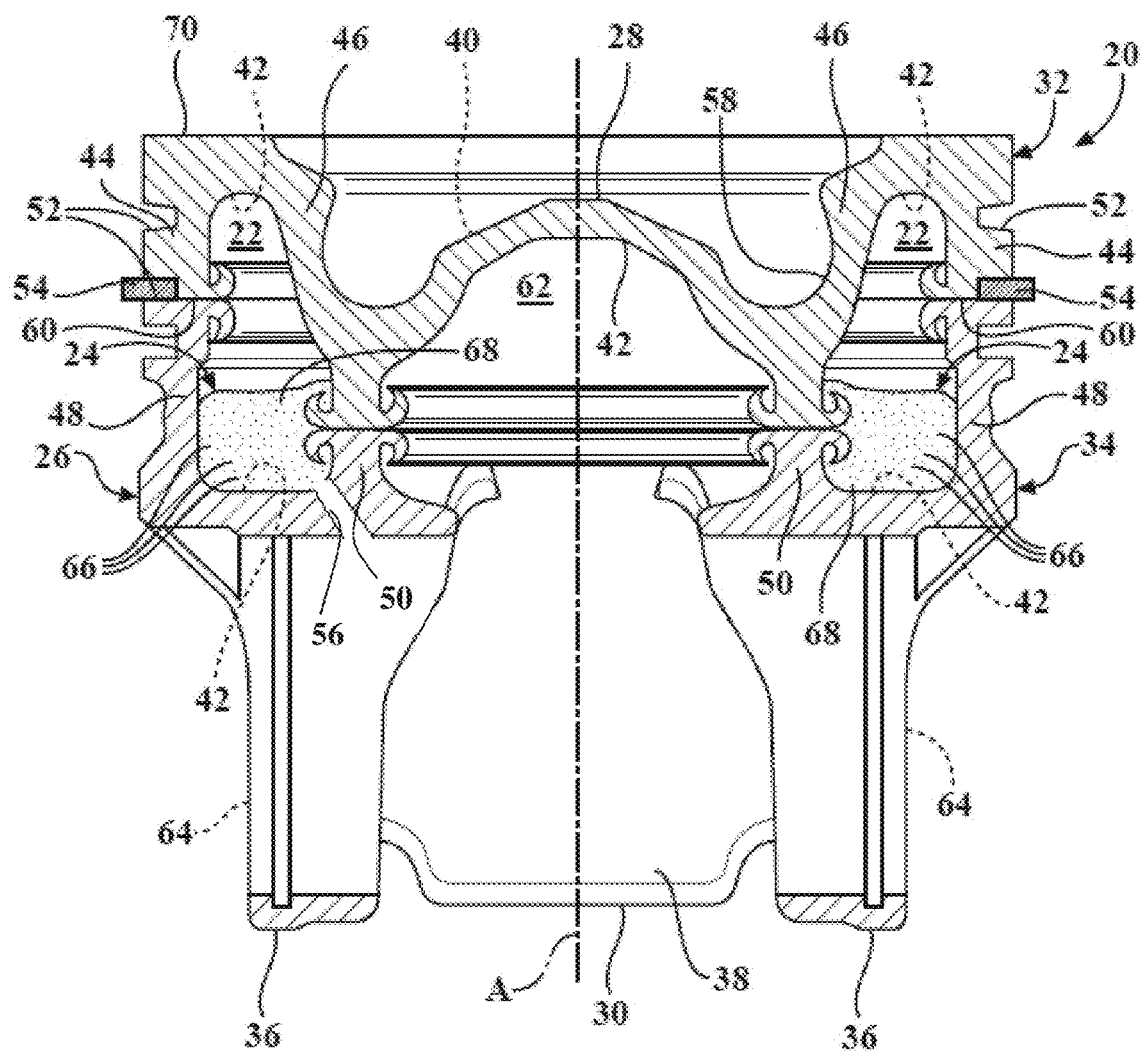
FIG. 1 is a side cross-sectional view of a piston according to one example embodiment of the invention.

Referring to FIG. 1, wherein like numerals indicate corresponding parts throughout the several views, an exemplary piston 20 for an internal combustion engine is generally shown. The piston 20 includes a sealed cooling gallery 22 partially filled with a thermally conductive composition 24 including at least one of bismuth and tin, and preferably a binary mixture consisting of bismuth and tin, to efficiently remove heat from an upper crown 32 of the piston 20.

The example piston 20 of FIG. 1 is a heavy duty diesel piston, which is disposed in a cylinder bore of the internal combustion engine. However, any other type of piston could be used with the thermally conductive composition 24 in the cooling gallery 22. As shown in FIG. 1, the piston 20 includes a body portion 26 extending circumferentially around a center axis A and longitudinally along the center axis A from an upper end 28 to a lower end 30. The body portion 26 is formed of a metal material, typically steel, but could alternatively be formed of aluminum, an aluminum alloy, or another metal. In the exemplary embodiment, the body portion 26 includes the upper crown 32, a lower crown 34, a pair of pin bosses 36, and a skirt 38.

The upper crown 32 of the piston 20 includes an outer surface 40 and an oppositely facing inner surface 42. The outer surface 40 of the upper crown 32 presents a bowl-shaped configuration at the upper end 28 which is directly exposed to hot combustion gases in the cylinder bore during operation. The cooling gallery 22 extends along least a portion of the inner surface 42 of the upper crown 32, opposite the bowl-shaped configuration, so that the thermally conductive composition 24 contained therein can dissipate heat away from the hot bowl-shaped configuration during operation. In the exemplary embodiment, the sealed cooling gallery 22 extends circumferentially around the center axis A, beneath a bowl rim 70 of the upper crown 32.

As shown in FIG. 1, the upper crown 32 includes a first outer rib 44 and a first inner rib 46 each extending circumferentially around the center axis A and longitudinally from the upper end 28 toward the lower end 30. The first ribs 44, 46 are spaced from one another, and the first inner rib 46 is disposed between the first outer rib 44 and the center axis A. The outer surface 40 of the first outer rib 44 presents a plurality of ring grooves 52 facing away from the center axis A and extending circumferentially around the center axis A for holding piston rings 54. An opening 56 extends through the lower crown 34 to the cooling gallery 22 for allowing the thermally conductive composition 24 to be fed into the cooling gallery 22 prior to sealing the cooling gallery 22. For example, the opening 56 could be formed in or adjacent to the second inner rib 50 of the lower crown 34, along the non-thrust plane of the piston 20. However, the opening 56 could alternatively be formed in other locations of the upper crown 32 or lower crown 34. A plug 58 is typically threaded into the opening 56 and then sealed with an adhesive, such as a high temperature epoxy composition. However, the opening 56 could alternatively be sealed using other methods, such as tungsten inert gas (TIG) welding, friction welding, laser welding, or brazing the plug 58 to the opening 56. Another sealing technique includes press-fitting the plug 58 into the opening 56, which takes less production time compared to the threading or welding techniques.

The body portion 26 of the piston 20 also includes the lower crown 34 extending from the upper crown 32 toward the lower end 30. The lower crown 34 presents the outer surface 40 including at least one ring groove 52 for holding the piston rings 54. The lower crown 34 also includes the inner surface 42 facing opposite the outer surface 40. The lower crown 34 includes a second outer rib 48 aligned with and connected to the first outer rib 44 of the upper crown 32, and a second inner rib 50 aligned with and connected to the first inner rib 46 of the upper crown 32. The second ribs 48, 50 extend circumferentially around the center axis A between the upper end 28 and the lower end 30 and are spaced from one another by the inner surface 42 of the lower crown 34. Thus, as shown in FIG. 1, the inner ribs 46, 50 and outer ribs 44, 48 of the upper and lower crowns 32, 34 form the sealed cooling gallery 22 therebetween. The second ribs 48, 50 are typically connected to the first ribs 44, 46 by friction welds 60, but could be connected by another type of weld or connection.

As shown in FIG. 1, the inner surface 42 of the upper crown 32 and the first inner rib 46 present a cooling chamber 62 therebetween. The cooling chamber 62 extends radially along a portion of the inner surface 42 of the upper crown 32 and longitudinally along the center axis A and is open towards the lower end 30. During operation, the cooling chamber 62 is exposed to the cylinder bore, and oil may be sprayed into the cooling chamber 62 to reduce the temperature of the piston 20.

The body portion 26 of the piston 20 also includes the pair of pin bosses 36 depending from the lower crown 34 and presenting a pair of laterally spaced pin bores 64 extending perpendicular to the center axis A. The body portion 26 also includes the skirt 38 depending from the lower crown 34. The skirt 38 is joined laterally to the pin bosses 36 and spaces the pin bosses 36 from one another. The outer surface 40 of the skirt 38 is convex for cooperation with the cylinder bore. Although the piston 20 shown in FIG. 1 is a single piece construction, the piston 20 could alternatively comprise other designs.

The thermally conductive composition 24 typically fills 10 to 90 volume percent (vol. %) of the cooling gallery 22, based on the total volume of the cooling gallery 22. The thermally conductive composition 24 is liquid at typical operating temperatures of the internal combustion engine. Thus, during operation, as the piston 20 reciprocates in the cylinder bore, the thermally conductive composition 24 flows throughout the cooling gallery 22 and dissipates heat away from the upper crown 32 through the piston 20 and to the surrounding environment.

The thermally conductive composition 24 includes at least one of bismuth and tin. According to one embodiment, the thermally conductive composition 24 includes, or consists of, tin and not bismuth. According to as second embodiment, the thermally conductive composition 24 includes, or consists of, bismuth and not tin. According to a third embodiment, the thermally conductive composition 24 includes, or consists of, both tin and bismuth.

According to an exemplary embodiment, the thermally conductive composition 24 includes the bismuth in an amount greater than or equal to 0 to 95 weight percent (wt. %) and the tin in an amount of 5 to 100 wt. %, based on the total weight of the thermally conductive composition 24. Typically, the thermally conductive composition 24 consists only of tin and bismuth, and the bismuth is present in an amount greater than 0 wt. %. In example embodiments, the thermally conductive composition 24 includes 38 to 48 wt. % tin and 52 to 62 wt. % bismuth, based on the total weight of the thermally conductive composition 24. In one preferred embodiment, the thermally conductive composition 24 is a thermally conductive medium, and the thermally conductive medium is a metallic composition consisting only of tin and bismuth. For example, the thermally conductive composition 24 can include the bismuth in an amount of 57 wt. % and the tin in an amount of 43 wt. %, based on the total weight of the thermally conductive composition 24. The thermally conductive composition 24 also consists of a single-phase and is unreactive.

The exemplary thermally conductive composition 24 typically has a melting point of 139 to 250° C., a thermal conductivity of 16 to 31 W/m·K, and a thermal diffusivity of 1.13 E-5 m$^2$/s to 1.86 E-5 m$^2$/s. For example, when the thermally conductive composition 24 is a metallic composition consisting of 57 wt. % bismuth and 43 wt. % tin, the thermally conductive composition 24 has a melting point of 139° C., a thermal conductivity of 22 W/m·K, and a thermal diffusivity of 1.43 E-5 m²/s.

The thermally conductive composition 24 exists in a single-phase, either solid or liquid, depending on temperature. Below the melting point, the thermally conductive composition 24 is in solid form. During engine operation, the temperature of the cooling gallery 22 is typically around 250 to 330° C., which is above the melting point of the thermally conductive composition 24. Thus, the thermally conductive composition 24 is in liquid form during engine operation. As the piston 20 reciprocates in the cylinder bore, the thermally conductive composition 24 exhibits a cocktail-shaker effect to transfer heat from the upper crown 32 across the cooling gallery 22 and to the lower crown 34 or other portions of the piston 20.

The thermally conductive composition 24 of bismuth and tin is oftentimes preferred over other compositions known for use in piston cooling galleries for several reasons. For example, the thermally conductive composition 24 includes no reactive, toxic, or cost-prohibitive chemicals. In addition, the thermally conductive composition 24 has a thermal conductivity around 22 W/m·K and a thermal diffusivity around 1.43 E-5 m²/s, which is approximately 224 and 290 times greater respectively than the two-phase composition of U.S. Pat. No. 9,127,619. Thus, the thermally conductive composition 24 is able to significantly improve efficiency of the internal combustion engine.

Another aspect of the invention provides a method of manufacturing the piston 20 containing the thermally conductive composition 24 in the sealed cooling gallery 22. The method generally includes feeding the thermally conductive composition 24 into the cooling gallery 22, and sealing the cooling gallery 22. As discussed above, the thermally conductive composition 24 does not require an inert environment during the sealing step, and is a single-phase, so that metering and delivery is simplified.

Various different methods can be used to form the piston 20 with the cooling gallery 22. However, according to one exemplary embodiment, the method includes forming the upper crown 32 and the lower crown 34, aligning the inner ribs 46, 50 and outer ribs 44, 48 of the upper and lower crowns 32, 34, and welding the ribs 44, 46, 48, 50 of the upper and lower crowns 32, 34 together to form the cooling chamber 62 and cooling gallery 22 therebetween, as shown in FIG. 1. The example method further includes forming the opening 56 to the cooling gallery 22. This step may include drilling a hole in the lower crown 34. In another preferred embodiment, the method includes drilling the opening 56 in the upper crown 32.

Figure 2:
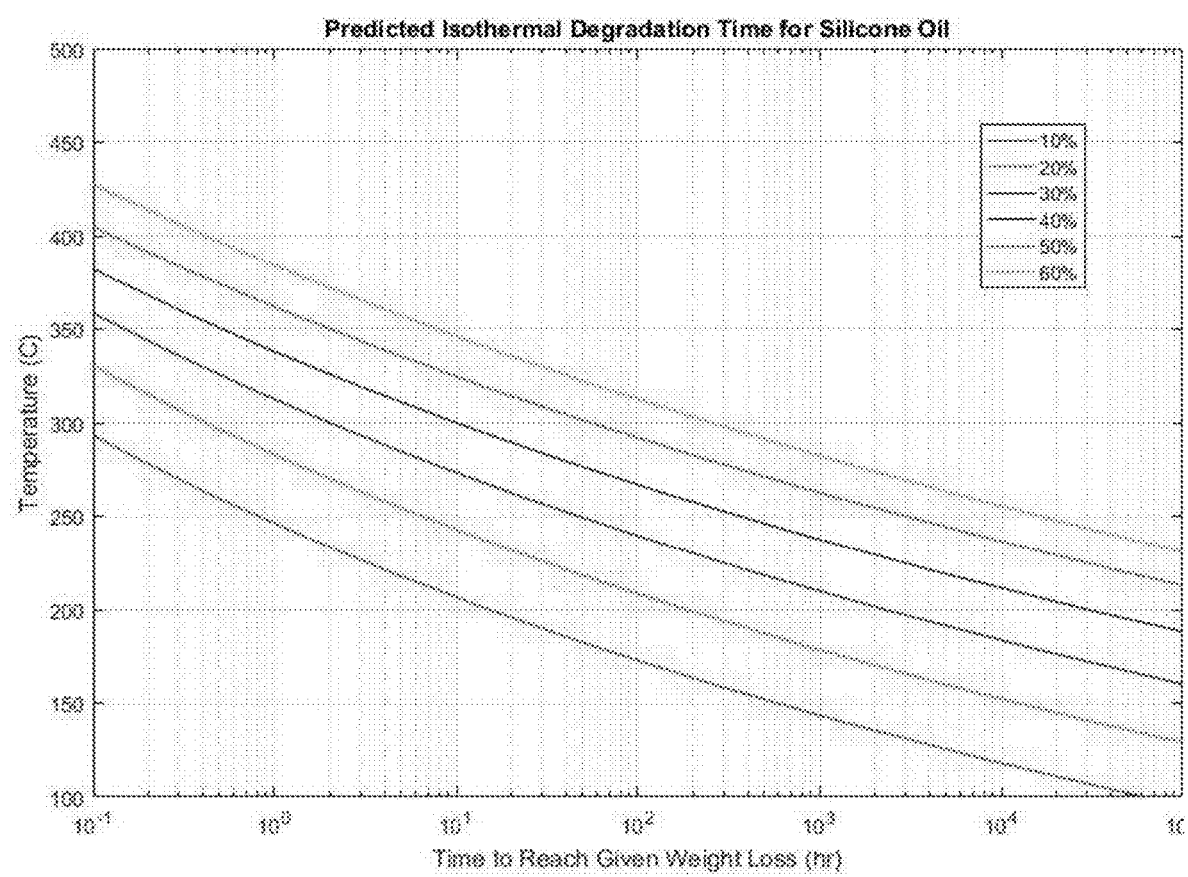
FIG. 2 is a graph illustrating predicted isothermal degradation time for silicone oil.

The method further includes feeding the thermally conductive composition 24 through the opening 56 and into the cooling gallery 22 under a non-inert atmosphere. However, an inert, dry atmosphere, typically nitrogen or argon, can be used if desired. The feeding step typically includes filling 10 to 90 vol. % of the cooling gallery 22 with the thermally conductive composition 24. During the feeding step, the thermally conductive composition 24 can be in the form of a liquid, or alternatively solid particles, such as powder or granules. Thus, the thermally conductive composition 24 can be poured into the opening 56 of the upper crown 32 or lower crown 34. Also, the thermally conductive composition 24 can be fed into the cooling gallery 22 before or after heat treatment of the piston 20. For example, the feeding step can occur after welding and prior to heat treatment. The bismuth and tin of the thermally conductive composition 24 will easily withstand the post-welding heat treatment temperature, which is typically greater than 600° C., such as about 650° C., unlike the silicone oil of the two-phase composition, which degrades around 365° C., and thus must be fed into the cooling gallery after heat treatment. FIG. 2 is a graph illustrating predicted isothermal degradation time for silicone oil.

The method also includes sealing the cooling gallery 22, typically immediately after feeding the thermally conductive composition 24 into the cooling gallery 22 and prior to heat treatment. The sealing step typically includes threading and tightening the plug 58 in the opening 56, with adhesive applied to the plug 58, such as a high temperature epoxy composition. In another embodiment, the opening 56 can be sealed by press fitting the plug 58 in the opening 56, which reduces production time. In yet another embodiment, the plug 58 can alternately be sealed by maintaining the piston 20 in the inert atmosphere, and then tungsten inert gas (TIG) welding or laser welding the plug 58 to the upper crown 32 or lower crown 34. Brazing and shrink-fit plugs and friction welded plugs are alternative ways also contemplated.

Obviously, many modifications and variations of the present invention are possible in light of the above teachings and may be practiced otherwise than as specifically described while within the scope of the appended claims.

What is claimed is:

1. A piston for an internal combustion engine, comprising:
   a body portion including an upper crown and a cooling gallery extending along least a portion of said upper crown, said cooling gallery being sealed;
   a thermally conductive composition disposed in said cooling gallery; and
   said thermally conductive composition consisting of bismuth in an amount of 57 wt. % and tin in an amount of 43 wt. %, based on the total weight of said thermally conductive composition.

2. The piston of claim 1, wherein said thermally conductive composition has a melting point of 139 to 250° C., a thermal conductivity of 16 to 31 W/m·K, and a thermal diffusivity of 1.13 E-5 m²/s to 1.86 E-5 m²/s.

3. The piston of claim 1, wherein said thermally conductive composition consists of a single-phase and is unreactive.

4. The piston of claim 1, wherein said thermally conductive composition has a melting point of 139° C.; said thermally conductive composition has a thermal conductivity of 22 W/m·K; and said thermally conductive composition has a thermal diffusivity of 1.43E-5 m²/s.

5. The piston of claim 1, wherein said thermally conductive composition fills 10 to 90 vol. % of said sealed cooling gallery, based on the total volume of said cooling gallery.

6. The piston of claim 1, wherein said body portion is formed of a steel material;
   said body portion extends circumferentially around a center axis and longitudinally along said center axis from an upper end to a lower end;
   said upper crown presents an outer surface and an oppositely facing inner surface and said cooling gallery extends along least a portion of said inner surface of said upper crown;
   said outer surface of said upper crown presents a bowl-shaped configuration at said upper end;
   said upper crown includes a first outer rib and a first inner rib each extending circumferentially around said center axis and longitudinally from said upper end toward said lower end, said first inner rib is disposed between said first outer rib and said center axis;

said outer surface of said first outer rib presents a plurality of ring grooves facing away from said center axis and extending circumferentially around said center axis for holding piston rings;

said body portion includes a lower crown extending from said upper crown to said lower end;

said lower crown presents an outer surface and an oppositely facing inner surface, and said cooling gallery extends along least a portion of said inner surface of said lower crown;

said lower crown includes a second outer rib connected to said first outer rib and a second inner rib connected to said first inner rib, said second ribs extends circumferentially around said center axis between said upper end and said lower end to form said sealed cooling gallery between said inner ribs and said outer ribs along a portion of said inner surface of said upper crown;

said second ribs are connected to said first ribs by welds;

said outer surface of said lower crown presents at least one ring groove;

at least one of said upper crown and said lower crown includes an opening extending into said cooling gallery for allowing said thermally conductive composition to be fed into said cooling gallery;

said inner surface of said upper crown and said inner ribs present a cooling chamber therebetween, said cooling chamber extends radially along a portion of said inner surface of said upper crown and longitudinally along said center axis and is open towards said lower end for being exposed to a cylinder bore;

said body portion includes a pair of pin bosses depending from said lower crown, said pin bosses including a pair of laterally spaced pin bores extending perpendicular to said center axis;

said body portion includes a skirt depending from said lower crown, said skirt being joined laterally to said pin bosses and spacing said pin bosses from one another;

said skirt includes an outer surface being convex for cooperation with said cylinder bore;

said thermally conductive composition fills 10 to 90 vol. % of said sealed cooling gallery, based on the total volume of said cooling gallery;

said thermally conductive composition consists of said bismuth and tin;

said thermally conductive composition is a medium, and the medium is a metallic composition;

said thermally conductive composition has a melting point of 139 to 250° C.;

said thermally conductive composition consists of a single-phase and is unreactive;

said thermally conductive composition has a thermal conductivity of 16 to 31 W/m·K;

said thermally conductive composition has a thermal diffusivity of 1.13 E-5 $m^2$/s to 1.86 E-5 $m^2$/s; and further comprising a plug threaded into said opening and sealing said cooling gallery.

7. The piston of claim 6, wherein said thermally conductive composition has a melting point of 139° C.; said thermally conductive composition has a thermal conductivity of 22 W/m·K; and said thermally conductive composition has a thermal diffusivity of 1.43E-5 $m^2$/s.

* * * * *